United States Patent [19]
Dewald

[11] Patent Number: 5,566,387
[45] Date of Patent: Oct. 15, 1996

[54] DIAMOND SHAPED HOLOGRAPHIC STORAGE REGIONS ORIENTED ALONG A COMMON RADIAL COLUMN LINE FOR HIGHER STORAGE DENSITY

[75] Inventor: Duane S. Dewald, Austin, Tex.

[73] Assignee: Tamarack Storage Devices, Austin, Tex.

[21] Appl. No.: 228,114

[22] Filed: Jun. 15, 1994

Related U.S. Application Data

[63] Continuation-in-part of Ser. No. 173,368, Dec. 23, 1993, Pat. No. 5,481,523.

[51] Int. Cl.⁶ .............................. G11B 7/00; G02B 5/32; G03H 1/16
[52] U.S. Cl. .................. 369/103; 369/94; 369/44.14; 369/275.1; 369/275.3; 369/283; 359/3; 359/30; 359/29
[58] Field of Search .................................. 369/103, 112, 369/283, 94, 44.14, 275.1, 275.3; 359/3, 4, 9, 22, 29, 30

[56] References Cited

U.S. PATENT DOCUMENTS

| | | | |
|---|---|---|---|
| 3,407,405 | 10/1968 | Hoadley | 364/108 |
| 3,408,656 | 10/1968 | Lamberts | 346/1 |
| 3,578,836 | 5/1971 | Hannan | 359/25 |
| 3,612,641 | 10/1971 | Eaglesfield | 359/11 |
| 3,635,538 | 1/1972 | Caulfield et al. | 359/7 |
| 3,837,725 | 9/1974 | Bricot et al. | 369/103 |
| 3,842,197 | 10/1974 | Broussaud | 369/109 |
| 3,874,785 | 4/1975 | Huignard | 359/310 |
| 3,891,976 | 6/1975 | Carlsen | 359/21 |
| 3,989,347 | 11/1976 | Eschler | 369/103 |
| 3,998,521 | 12/1976 | Eschler | 369/103 |
| 4,038,647 | 7/1977 | Schneider | 340/173 CC |
| 4,063,226 | 12/1977 | Kozma et al. | 365/125 |
| 4,063,795 | 12/1977 | Huignard et al. | 359/7 |
| 4,138,189 | 2/1979 | Huignard et al. | 359/7 |

(List continued on next page.)

FOREIGN PATENT DOCUMENTS

0451386A1 10/1991 European Pat. Off. .

OTHER PUBLICATIONS

Steve Redfield, "Holographic Storage: Not a Device but a Storage Class," *SPIE*, vol. 1785, pp. 45–51, 1992.
Ellen Muraskin, "Memory Crystal," *Popular Science*, p. 38, Aug. 1992.
Kirk Ladendorf, "MCC Spinoff Attracts Influx of Capital," *Austin American–Statesman*, Saturday, Feb. 13, 1993.
News Release of Microelectronics and Computer Technology Corporation dated Feb. 12, 1993.
Carolyn Duffy Marsan, "Holographic Memory Could Revolutionize Info Storage," *Federal Computer Week*, Mar. 25, 1991.
Andrew Pollac, "The Hologram Computers of Tomorrow," *The New York Times*, Jun. 9, 1991.
Steve Redfield and Lambertus Hesselink, "Enhanced Nondestructive Holographic Readout in Strontium Barium Niobate," *Optical Society of America*, 1988.

*Primary Examiner*—Georgia Y. Epps
*Assistant Examiner*—Kim-Kwok Chu
*Attorney, Agent, or Firm*—Gregory M. Howison

[57] ABSTRACT

A disk-based holographic storage media includes a disk fabricated from a holographic storage media. A plurality of holographic storage regions are defined within the storage media such that pages of holographic data can be stored therein in the form of an interference grating. A Read/Write head is provided for containing the optics necessary to read information from the holographic storage region and write information thereto. The Read/Write head moves along the radial direction of the disk with the disk stepped by a motor to discrete angular positions, comprising the address of the storage region along with radial positioning of the Read/Write head. Each of the storage regions is diamond-shaped and oriented such that the apexes thereof are oriented along a common radial column line. Adjacent columns have the storage regions disposed in alternating rows or tracks. This allows for a higher packing density.

19 Claims, 8 Drawing Sheets

U.S. PATENT DOCUMENTS

| | | | |
|---|---|---|---|
| 4,175,823 | 11/1979 | Pekau et al. | 369/103 |
| 4,213,193 | 7/1980 | Reid et al. | 365/125 |
| 4,224,480 | 9/1980 | Satoh et al. | 369/103 |
| 4,256,362 | 3/1981 | Bardos | 359/29 |
| 4,295,162 | 10/1981 | Carlsen | 369/103 |
| 4,336,976 | 6/1982 | Rodemann et al. | 359/22 |
| 4,458,345 | 7/1984 | Bjorklund et al. | 369/103 |
| 4,550,395 | 10/1985 | Carlson | 369/103 |
| 4,789,977 | 12/1988 | Oudenhuysen et al. | 369/109 |
| 4,927,220 | 5/1990 | Hesselink et al. | 359/7 |
| 4,961,615 | 10/1990 | Owechko et al. | 359/11 |
| 5,007,690 | 4/1991 | Chern et al. | 369/103 |
| 5,212,572 | 5/1993 | Krantz et al. | 359/15 |
| 5,285,438 | 2/1994 | Marchand et al. | 369/103 |
| 5,331,621 | 7/1994 | Miyake et al. | 369/103 |
| 5,339,305 | 8/1994 | Curtis et al. | 369/103 |
| 5,377,176 | 12/1994 | Redfield | 369/103 |
| 5,416,616 | 5/1995 | Jenkins et al. | 369/103 |
| 5,477,347 | 12/1995 | Redfield et al. | 369/103 |
| 5,481,523 | 1/1996 | Dewald | 369/103 |

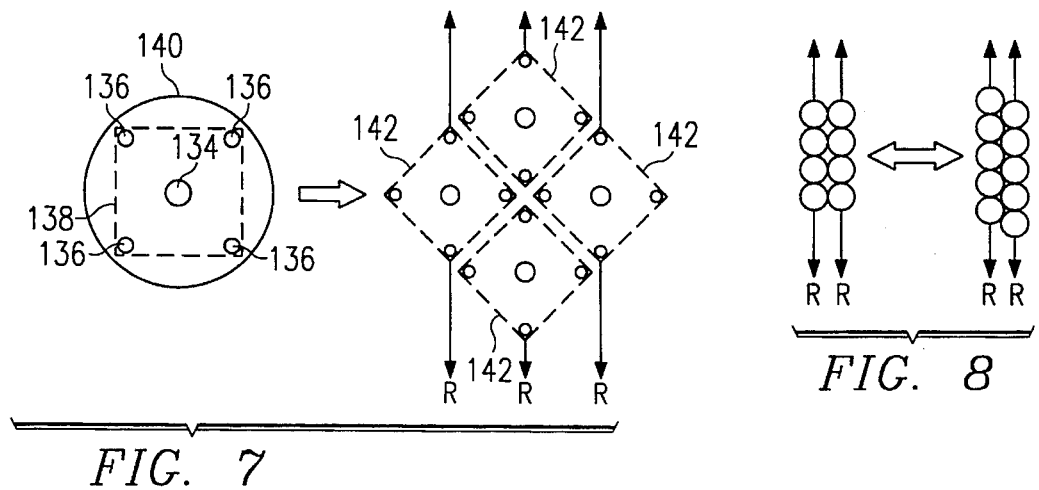
FIG. 7
FIG. 8
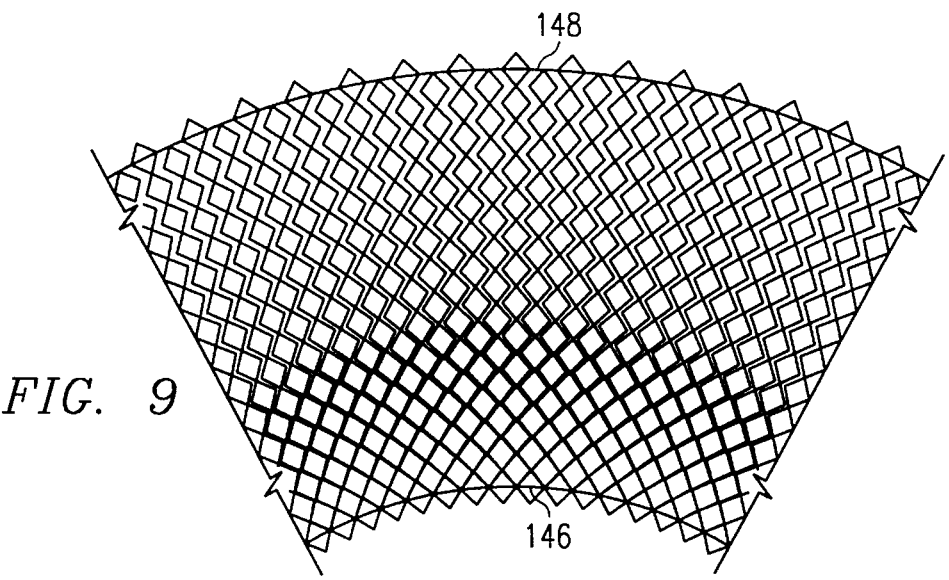
FIG. 9
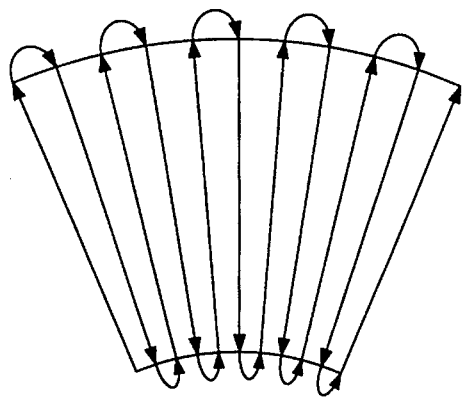
FIG. 9a
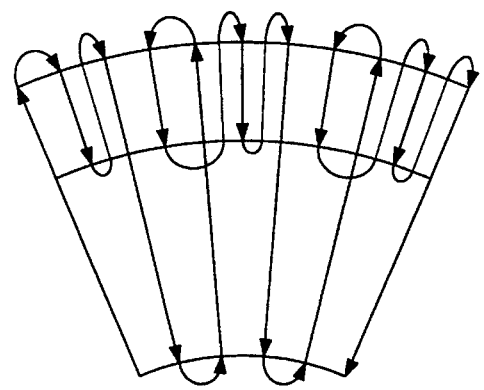
FIG. 10a

DIAMOND SHAPED HOLOGRAPHIC STORAGE REGIONS ORIENTED ALONG A COMMON RADIAL COLUMN LINE FOR HIGHER STORAGE DENSITY

CROSS REFERENCE TO RELATED APPLICATIONS

This application is a continuation-in-part of U.S. patent application Ser. No. 08/173,368, filed Dec. 23, 1993, now U.S. Pat. No. 5,481,523, issued on Jan. 2, 1996, and entitled "Miniature Read/Write Head for Holographic Storage" (Atty. Dkt. No. TAMA-22,454) and is related to U.S. patent application Ser. No. 08/134,925, filed Oct. 7, 1993, now abandoned and entitled "Method and Apparatus for Positioning a Light Beam on a Holographic Media" (Atty. Dkt. No. TAMA-22,405) and U.S. patent application Ser. No. 08/133,504, filed Oct. 7, 1993, and entitled "High Capacity Holographic Storage System" (Any. Dkt. No. TAMA-22, 409).

TECHNICAL FIELD OF THE INVENTION

The present invention pertains in general to holographic data storage devices, and more particularly, to a disk based holographic storage media.

BACKGROUND OF THE INVENTION

As the need for increased data storage changes, the search for higher density, faster access memory technologies also increases. One of these, holographic data storage, provides the promise for increased access to higher density data. The techniques for realizing such storage typically utilize some type of storage media, such as photorefractive crystals or photopolymer layers, to store 3-D "stacks" of data in the form of pages of data. Typically, coherent light beams from lasers are utilized to perform the addressing, writing and reading of the data from the storage media by directing these beams at a specific region on the surface of the media. Writing is achieved by remembering the interference pattern formed by these beams at this region. Reading is achieved by detecting a reconstructed light beam as it exits the storage medium, the data then being extracted therefrom. Addressing is achieved by the positioning of the laser beams, and this is typically done through the mechanical movement of mirrors or lenses; however, the storage media itself can be moved relative to fixed laser beams.

There are two types of devices for positioning a data and a reference beam onto a specific location within the holographic storage media, one type for positioning the media itself and one type for positioning the data and reference beam, or a combination of both types. When the media is positioned, this has the advantage of utilizing less complex optics. However, it has some disadvantages in the type of mechanism utilized to position the media in that it is mechanical and thus positioning speed is a concern. In positioning systems that rely upon optics to direct both the data beam and the reference beam, there exists some disadvantages due to the complexity of the optics. For example, if the storage media were dimensioned in a 2"×2" format, this might require optical lenses on the other of 2"–2½" in diameter. Further some care must taken in the beam deflection systems utilized in association with an optics-only system to ensure that storage locations on the perimeter of the storage media, i.e., the extrema, are not subject to distortions, as these are probably the most difficult regions to access. Of course, a combination of the two systems could be utilized with the disadvantages of both systems being represented in the combination.

When applying holographic storage techniques to disk-based systems, it is necessary to rotate the storage media to a certain position and either write the information thereto or retrieve the information therefrom. This requires some angular information and radial information as to the location of the storage input region on the disk. Further, this is a two-dimensional storage region and not a one-dimensional storage region. As such, the amount of data that can be stored on the disk is a function of the packing technique utilized wherein the placement of the storage regions is defined. With two-dimensional disks, the storage regions can be organized or arranged such that they are evenly spaced and offset to achieve the most efficient packing density However, this is not readily accomplished on a disk since rows and columns are not present, as would be the case with a rectangular media.

SUMMARY OF THE INVENTION

The present invention disclosed and claimed herein comprises a holographic data storage system utilizing a disk-shaped storage media. The storage media is a holographic media that is comprised of a layer of holographic storage media having a predetermined thickness and a disk shape with a rotational center. The holographic storage media layer is operable to store holographic representations of a data image in storage regions. A plurality of these storage regions are defined within the layer and disposed in addressable arcuate rows and radial columns. Each of the arcuate rows is disposed about a concentric arc a finite distance from the rotational center, and each of the radial columns is disposed along a line extending outward from the rotational center. The media is rotated about its rotational center by a media drive to an addressed one of the radial columns. A Read/Write head is provided which is operable to be positioned proximate to an addressed one of the storage locations. After positioning, the Read/Write head is operable to either read information from the addressed storage location or store information therein. A Read/Write head positioning device is operable to position the Read/Write head proximate to the addressed location.

In another aspect of the present invention, the holographic storage media is a Write Once, Read Many media. The media comprises a substrate over which a layer of photopolymer material is disposed. The photopolymer material is operable to store interference gratings representing the data image. The photopolymer contains a plurality of optically sensitive constituents that polymerize to form the interference gratings. These constituents are depletable and, therefore, after a predetermined number of data images are stored in a specific storage location, constituents are used up and no more information can be stored in that storage location.

In yet another aspect of the present invention, the positioning device is operable to move the Read/Write head in a radial direction from the arcuate row disposed closest to the rotational center to the arcuate row disposed the farthest away from the rotational center along a radial line extending from the rotational center. The access operation therefore requires the media drive to position the disk such that one of the radial columns is disposed along the path of the Read/Write head and then the Read/Write head moved along the radial column through the addressed one of the storage locations.

In a further aspect of the present invention, each of the storage locations is diamond-shaped with two of the opposing apexes thereof substantially aligned along the associated one of the radial column lines. The associated ones of the storage regions in the first arcuate row closest to the rotational center are disposed in close proximity to each other. The storage regions in the first arcuate row are disposed in alternating ones of the radial columns such that all of the storage regions associated with the radial columns in the first arcuate row are associated with odd-numbered ones of the arcuate rows. The adjacent ones of the column lines are associated with storage regions in even-numbered ones of the arcuate rows. The storage locations in the second arcuate row disposed closest to the first arcuate row are in close proximity to the storage locations in the first arcuate row. The arcuate rows are separated by a distance of approximately one-half a pitch of each of the storage regions.

BRIEF DESCRIPTION OF THE DRAWINGS

For a more complete understanding of the present invention and the advantages thereof, reference is now made to the following description taken in conjunction with the accompanying Drawings in which:

FIG. 7 illustrates a diagrammatic view of the portion of the Fourier transform stored in the storage location and the packing configuration of the present invention;

FIG. 8 illustrates a prior art packing method for packing circular holographic storage regions;

FIG. 9 illustrates a section through the disk illustrating the packing organization of the present invention;

FIG. 9a illustrates an access method for sequentially accessing data in the configuration of FIG. 9;

FIG. 10a illustrates the method for accessing data in the configuration of FIG. 10;

DETAILED DESCRIPTION OF THE INVENTION

Figure 1:
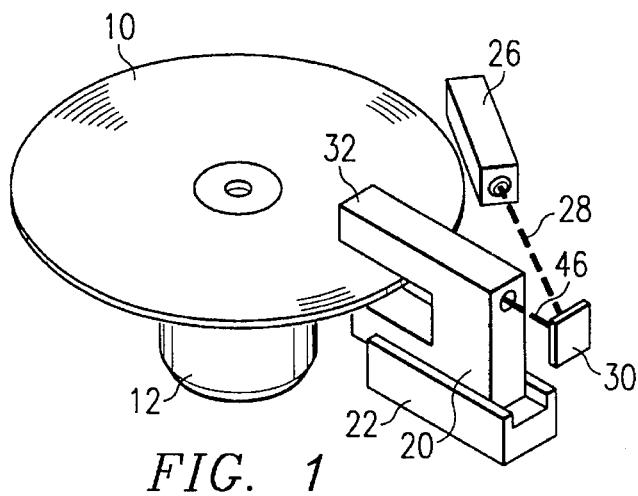
FIG. 1 illustrates a perspective view of one embodiment of the beam positioning system utilizing a movable optic system in a gantry.

Referring now to FIG. 1, there is illustrated a perspective view of one embodiment of the invention. A holographic storage media in the form of a disk 10 is provided. The disk 10 is operable to be rotated by a disk stepping drive 12 that is operable to selectively position one of a plurality of storage locations 54 within the storage media 10. Digital data is converted into an image that is comprised of a plurality of "light areas" and "dark areas" in a predetermined pattern. This image is convened into a Fourier transform and then stored in the storage location in the form of an interference grating caused by the interference of a reference beam with an object beam having the data image superimposed thereon. As will be described hereinbelow, a plurality of interference gratings illustrating a plurality of "pages" 11 of data are stored in a given storage location 54. Each of the storage locations 54 are arranged in a predetermined pattern on the holographic storage media 10 and are separated by a predetermined distance. A diagrammatic view of the storage region 54 and the multiple pages 11 of information that can be stored therein is illustrated in FIG. 1b.

Figure 1A:
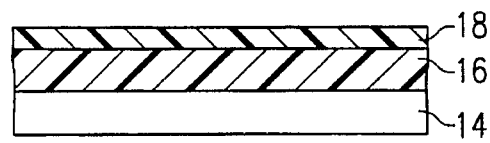
FIG. 1a illustrates a cross sectional view of the storage media.
Figure 1B:
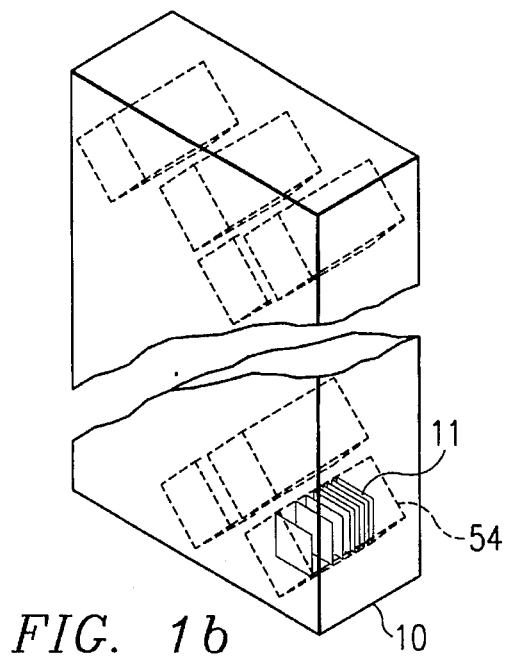
FIG. 1b illustrates a diagrammatic view of the storage locations.

Referring now to FIG. 1a, there is illustrated a cross-sectional diagram of the storage media 10. A substrate 14 is provided which is comprised of high quality optical surface, such as glass. This is approximately 900 microns in thickness. A layer of photopolymer material 16 is disposed on the surface of the substrate 14 to a thickness of approximately 20 microns. The photopolymer material 16 is a material that undergoes photo-induced polymerization. These compositions have been used to form conventional holograms. These are typically fabricated from a viscous or gelatin-like composition which is photoreactive. When two laser beams intersect in this composition to set up an interference pattern, this causes selective polymerization within the material. These compositions typically contain a polymeric binder, a liquid ethylinically unsaturated monomer and a photoinitiator system. Typically, the layer of viscous or gelatin-like recording material is spun or web coated onto the substrate 14 such as glass to provide a thin coating. A capping layer 18 of material such as Mylar® is then disposed over the gelatin layer. This provides a relatively good optical surface on the upper surface of the gelatin layer, and the glass substrate provides a high quality optical surface on the bottom surface of the gelatin-like recording layer.

When the data beam and reference beam interfere within the storage region 54, the polymerization caused thereby results in the formation of an interference grating. This represents the Fourier transform of the data image that was superimposed on the data beam which, as will be described hereinbelow, can be recovered later as a reconstructed data image by again illuminating the area with a reference beam having substantially the same parameters as the reference beam utilized for the original storage of the interference grating therein.

The optics for both the recording operation and the playback operation are contained within a gantry 20. The gantry 20 is operable to reciprocate along a radial line from the center of the disk 10 outward therefrom under the control of a drive mechanism 22. The drive mechanism 22 is a stepper mechanism that is operable to incrementally move the gantry 20 along the radial line such that the optics can be positioned over a predetermined one of the storage locations 54 on the storage media 10. A laser 26 is provided that is operable to generate a laser beam 28. The laser 26 is a diode laser operating at a wavelength of 680 nanometers with a power of approximately 30 milliwatts. The laser beam 28 is directed toward a reflecting surface 30, which reflecting surface 30 is operable to redirect the beam 28 along the reciprocating path of the gantry 20, such that the angle of the beam 28 and the location thereof upon entry to the gantry 20 are substantially the same for all positions along the path. The most distal end 32 of the gantry 20 is therefore moved from the most centrally disposed storage location 54 to the most peripherally disposed storage location 54 on the surface of the media 10 for any position of the stepping motor 12. As will be described hereinbelow, by utilizing the movable optics in combination with the rotation of the media 10, a less complex optics system can be utilized in combination with the movement thereof, which movement is more easily achieved than movement of the media alone.

Figure 2:
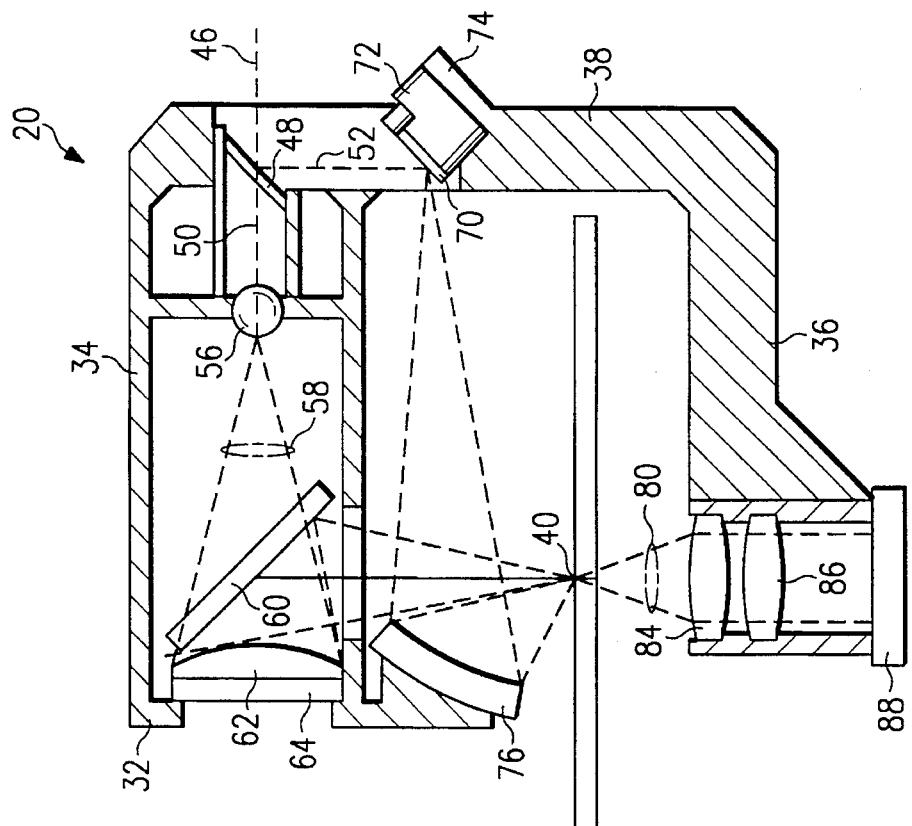
FIG. 2 illustrates a cross-section diagram of one embodiment of the gantry.

Referring now to FIG. 2, there is illustrated a cross-sectional view of the gantry 20. The gantry 20 is comprised of an upper support arm 34 and a lower support arm 36, support arms 34 and 36 connected together by a vertical support arm 38. The upper support arm 34 is operable, in the embodiment of FIG. 2, to support the optics necessary to direct a data beam and a reference beam to a given storage location 40 on the surface of the media 10. It will be seen that only a portion of the media, indicated by a reference numeral 42, is operable to store information thereon. The central portion of the disk 44 is provided for support. The lower support arm 36 is operable to contain the detection optics for receiving a reconstructed data image, as will be described hereinbelow.

The laser beam 28 is reflected from the mirror 30 as a light beam 46, light beam 46 input to a beam splitter 48. The beam splitter 48 is operable to direct a portion of the beam as a data beam 50 and a portion of the beam 46 as a reference beam 52. The data beam 50 is directed toward an expanding optics device 56, which is operable to expand the data beam 50 into an expanded data beam 58, the optics device 56 comprising a positive lens. The expanded data beam 58 is directed through a polarizing beam splitter 60 to a transform lens 62 which is operable to convert the expanded data beam 58 into a collimated beam which is then directed toward a spatial light modulator (SLM) 64. The SLM 64 is comprised of a plurality of polarizing optical elements such as LCDs that are disposed in an array. The LCDs are operable to reflect the light directed thereto with a predetermined polarization. The relative polarization between the different portions of the beams associated with the different elements of the array define binary bits of data and the array defines an overall data image. The data image represents a "page" of information, this page alterable depending on the input provided thereto (not shown). When the data beam is reflected back from the SLM 64, it is again passed through the transform lens 62 and reflected off of the polarizing beam splitter 60 onto the storage location 40, this representing the Fourier transform at the storage location 40.

The vertical support member 38 is operable to support a rotating mirror 70 on a motive device 72, motive device 72 mounted on a support member 74 extending from the vertical support member 38. The mirror 70 is oriented such that it has a rotational axis extending outward from the drawing of FIG. 2. The reference beam 52 is operable to impinge upon the rotational axis of the mirror 70 and be reflected therefrom at one of a plurality of angles, depending upon the angle of rotation of mirror 70, as will be described hereinbelow. This will provide a redirected reference beam at one of a plurality of angles that is directed toward an elliptical mirror 76 and reflected therefrom to the storage location 40.

In order that the reference beam for all angles of reflection from the mirror 70 can be directed toward the storage location 40, the elliptical mirror 76 is disposed such that one of its foci is disposed on the rotational axis of the mirror 70 and one of its foci is disposed on the storage location 40. Therefore, all redirected reference beams emanating from the surface of the mirror 70 at the one foci will be redirected toward the other foci at the storage location 40.

During a record operation, the SLM 64 is operable to create a data image which is then focused by the lens 62 to create the Fourier transform and direct it to the storage location 40 via the polarizing beam splitter 60, which is operable to reflect the beam with the data superimposed thereon to the storage location 40. At the same time, the reference beam 52 is directed at one of the predetermined angles to the storage location 40 to interfere with the data beam. This causes an interference grating to be created and stored within the storage media 10 at the storage location 40. It takes approximately 10–30 milliseconds to form an interference grating within the photopolymer material that comprises the storage media 10. During a playback operation, the SLM 64 is controlled such that no light is reflected therefrom. The reference beam 52 is therefore directed at one of the predetermined locations associated with the desired page. This is a function of addressing logic, which is operable to position the mirror 70. Although not described, the addressing logic also selects which one of the storage locations 40 on the surface of the media 42 is selected for both the record and the playback operations.

When the angle for the reference beam 52 is selected, the storage location 40 is illuminated, resulting in the page of information associated with that angle being reconstructed as a reconstructed data beam 80. The reconstructed data beam 80 is then passed through reconstruction lens 84 and 86, which is operable to collimate the light down onto a detector array 88, which is comprised of an array of detector elements such as CCDs. These CCDs, although not shown, are disposed in the array such that there will be at least one CCD element for each binary data bit in the original data image that was formed by the SLM 64. The detector array 88 is disposed such that the reconstructed data beam 80 will be imaged on the surface thereof.

Figure 3:
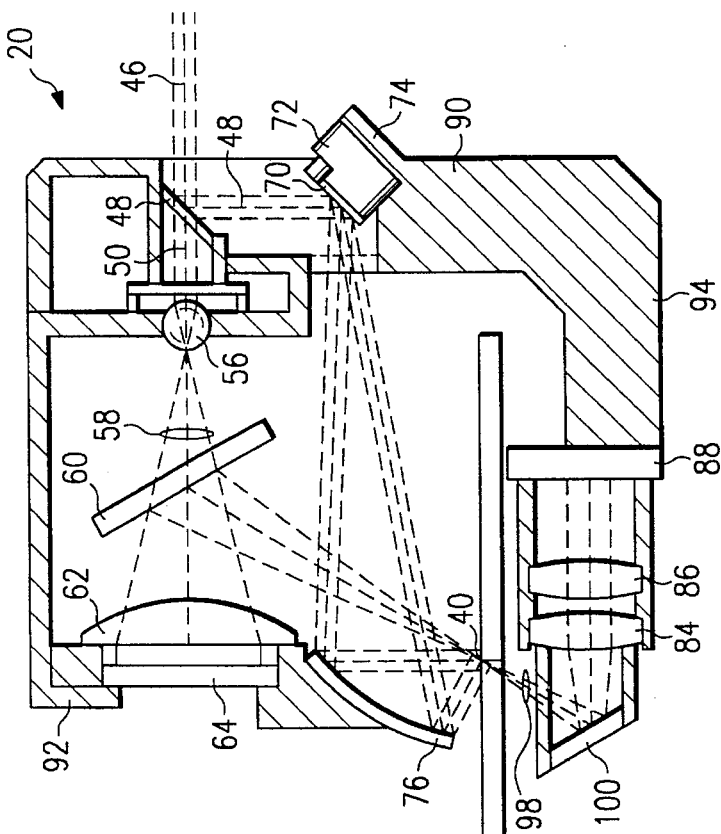
FIG. 3 illustrates an alternate embodiment of the movable optics system illustrating a cross-section of the gantry and the media.

Referring now to FIG. 3, there is illustrated an alternate embodiment of the gantry 20 of FIG. 2. A vertical support member 90 is operable to hold an upper horizontal support member 92 and a lower horizontal support member 94. As described above with reference to FIG. 2, the upper support member 92 is operable to support the beam splitter 48 that receives the input beam 46 and splits it into the reference beam 48 and the data beam 50, the data beam 50 then being passed to the expanding optics 56 to provide the expanded data beam 58. The beam splitter 60 is disposed such that it is closer to the expanding optics 56 relative to the FIG. 2 embodiment. Further, the collimation/transform lens 62 is disposed slightly forward and offset from the surface of SLM 64 relative to the FIG. 2 embodiment, such that the focal length thereof is pulled somewhat forward. The beam splitter 60, as described above, is a polarizing beam splitter operable to pass the expanded data beam through to the lens 62 for collimation thereof and reflection from the surface of SLM 64. When reflected, the data beam is again focused on the surface of the storage location 40. However, the angle of the beam splitter 60 is altered relative to the FIG. 2 embodiment such that the focused beam from the SLM 64 and lens 62 is directed at an angle to the storage location 40. Therefore, the reconstructed data beam will also exit the other side of the storage media 10 at an angle relative thereto. This is to be compared with the embodiment of FIG. 2, wherein the focused data beam is substantially perpendicular to the surface of the media 10. The reference beam 52 is again reflected from the rotational axis of the reflecting surface 70 to the surface of the elliptical mirror 76 for multiple angles thereof. The reflecting surface 70 is actuated by the motive device 72 which is mounted on the support member 74 associated with the vertical support member 90.

The reconstruction optics of FIG. 3 is disposed at a 90° orientation relative to the reconstruction optics of FIG. 2, comprised of the lens 84 and 86 and the detector 88. In the embodiment of FIG. 3, the detector 88 is disposed at a right angle to the surface of the disk 10. A reconstructed beam 98 will exit the storage location 40 during a playback operation wherein a reference beam is directed thereto at a predetermined angle as defined by the angle of the mirror 70. The reconstructed beam 98 is directed toward a folded mirror 100 that is disposed at an angle relative to the surface of the media 10 such that the reconstructed beam 98 is redirected to the surface of the lens 84 and passes through the lens 84 and the lens 86 to the surface of the detector 88. The configuration of FIG. 3 therefore provides a more compact arrangement as compared to the embodiment of FIG. 2.

Figure 4:
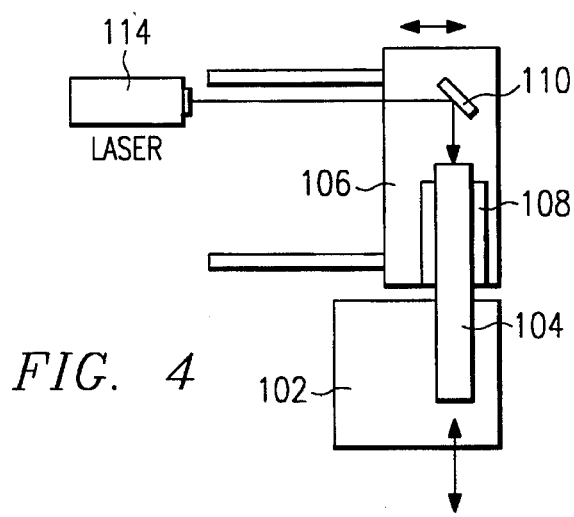
FIG. 4 illustrates an alternate embodiment showing a two-dimensional media wherein the gantry is moved in both an x- and a y-direction.

Referring now to FIG. 4, there is illustrated an alternate embodiment of the present invention that utilizes a two-dimensional media 102. The two-dimensional media 102 is illustrated as being a square, which is approximately 2"×2" in dimension. A gantry 104 is provided which is similar to a gantry 20 described above with reference to FIGS. 1–3. The gantry 104 is mounted on a movable platform 106 and is driven by a stepping motor drive 108 that is fixedly attached to platform 106. The platform 106 is operable to move in the y-direction, whereas the stepping motor drive 108 is operable to reciprocate the gantry 104 in the x-direction relative to the surface of the media 102. A reflecting surface 110 is disposed on the platform 106 and is operable to receive a light beam from a laser 114 that is directed along the y-axis such that it is reflected from the surface of mirror 110 along the x-axis and directed along the line of reciprocation of the gantry 104. Therefore, as the gantry 104 reciprocates in response to the stepping motor drive 108, the light beam reflected from the surface 110 is maintained along the direction of movement. Further, the platform 106 is operable to be reciprocated by a stepping motor 106 (not shown) along the y-axis, such that the light beam from the laser 114 will always impinge upon the same location on the reflecting surface 110 and will therefore always be directed along the line of reciprocation of the gantry 104.

Figure 5:
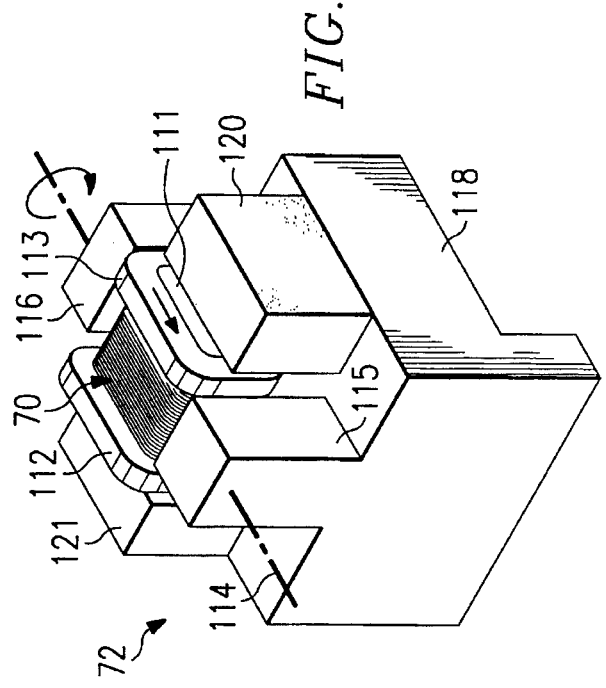
FIG. 5 illustrates a detail of the angle multiplexing lens for selecting pages of information.

Referring now to FIG. 5, there is illustrated a detailed perspective view of the mirror 70 and the carrier 72. The mirror 70 is integrally formed on a block 111 which is cuboidal in shape. The block 111 has one surface thereof mirrored to provide the mirror 70. Two of the sides orthogonal thereto are provided with coils 112 and 113 disposed thereon. When current is run through the coils, they create a magnetic field. The two sides orthogonally disposed with respect to the sides 112 and 111 and the side on which mirror 70 is formed are rotational surfaces that rotate about a rotational axis 114. Two pivot members (not shown) are provided in two mounting arms 115 and 116, disposed on opposite sides of the block 111. Each of the pivoting members (not shown) extend therefrom toward the block 111 with the surfaces of the block 111 adjacent thereto having a detent disposed therein for interfacing with the pivoting members. The block 111 therefore freely pivots about these members.

The mounting arms 115 and 116 are formed on a mounting block 118 which also has two magnets 120 and 121 disposed thereon adjacent the coils 112 and 113, respectively. The coils 112 and 113 have wires (not shown) associated therewith that allow the current flow and the direction thereof to be controlled. As such, a force vector will result in rotation of the block 111 about the rotational axis 114. By changing the magnitude and direction of the current, the block 111 can be rotated through a range of angles about the rotational axis 114.

Figure 6:
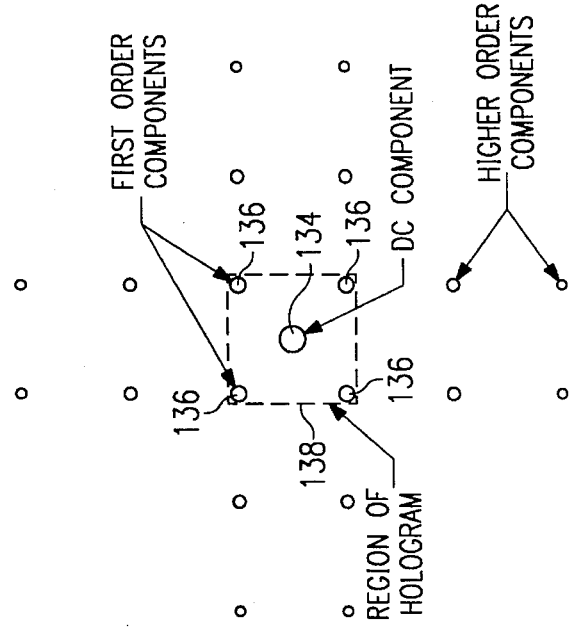
FIG. 6 illustrates a diagrammatic view of a typical Fourier transform of random data stored in a holographic storage region.

Referring now to FIG. 6, there is illustrated a top view of a Fourier transform of a random data pattern as it exists when a data beam would impinge the surface of the holographic storage media. The Fourier transform will have a central DC component 134 and the first order components 136 disposed about the DC component 134 in a rectangular pattern. The overall pattern extending from the first order components outward is a star-shaped pattern which is comprised of various high order components. However, the large portion of the energy in the Fourier transform resides within the boundaries defined by the four first order components 136. As will be described hereinbelow, the boundaries of the storage region are defined by a dotted line 138. By utilizing the energy within this boundary 138, recoverable data can be adequately stored.

Referring now to FIG. 7, there is illustrated a diagrammatic view of the packing technique utilized in the present invention. Typically, the storage region on a holographic storage media is defined as a circular-shaped region 140. However, the present invention utilizes only the portion of the Fourier transform within the boundaries 138 and orients this into a "diamond" shape. The regions are therefore diamond-shaped regions 142 which are disposed such that the apexes thereof are aligned along radial lines that pass through the DC component 134. This arrangement will become apparent with respect to the overall disk packing organization described hereinbelow.

Referring now to FIG. 8, there is illustrated a prior art method for packing circular storage regions. In one technique, illustrated on the left side of FIG. 8, the circular storage regions are placed in columns and rows adjacent each other such that two columns represent two radial lines. In the second configuration illustrated in the right side of FIG. 8, the adjacent columns of circular storage regions are disposed in an offset manner such that the center of storage regions in adjacent columns are staggered by fifty percent, i.e., they are in different and staggered rows. However, when packaging storage regions in this manner, the number of storage regions that can be packed is less than that utilizing the configuration of FIG. 7 with the diamond-shaped storage regions in the packing configuration illustrated therein.

Referring now to FIG. 9, there is illustrated a section of an optical storage disk illustrating the packing system utilizing a diamond-shaped storage region. The section illustrates an inner track 146 with a radius of approximately 15 millimeters and an outer track 148 with a radius of approximately 30 millimeters. The packing configuration utilizes a diamond-shaped storage region, similar to the storage region 142 of FIG. 7, with a "pitch" of one millimeter, the pitch being defined as the width of the holographic storage region 142 between the centers of the storage regions. In the first arcuate row, the storage regions 146 along the inner track 146 are packed adjacent each other, this being the closest packing that can be achieved along the inner track 146. The second and next arcuate row is offset by fifty percent of the pitch from the first arcuate row and disposed adjacent thereto. However, each of the storage regions in the first arcuate row comprises a radial column and each storage region in the second arcuate row comprises an adjacent radial column to each of the radial columns associated with the first arcuate row. As such, as the read/write head progresses outward from the center of the disk, the apexes of adjacent ones of the diamond-shaped storage regions within any given radial column are disposed adjacent each other. Therefore, the angular position of each storage region in a given radial column will be the same on the surface of the disk. Each arcuate row of diamond-shaped storage regions will be along the same arc but with a different angular position. Therefore, it a given storage region were to be accessed, it is only necessary to access a given angular position and a given radial position on the surface of the disk. If sequential and adjacent storage regions are to be accessed along a given column, it is only necessary to change the radial position along a given track or arcuate row. Conversely, if the storage regions in a given arcuate row along a given arc are to be sequentially accessed, it is only necessary to increment the disk by a predetermined number of degrees to access each storage region along that given arc. It should be noted that adjacent rows of storage elements are in alternating columns to provide maximum packing density. The embodiment of FIG. 9 accommodates 2444 storage regions.

Referring to FIG. 9a, there is illustrated a technique for sequentially accessing the storage regions in the most efficient manner. This is achieved by beginning at the outer track 148 at a given radial column, accessing the first storage region, reading the pages of information therefrom and then repositioning the miniature Read/Write head along the same radial column by a distance of one millimeter for the next storage region, with the disk maintained at a fixed angular position. This continues until the row closest to the inner track 146 is reached, at which point the disk is stepped to the next radial column and then the miniature Read/Write head moved outward to the next and first arcuate row by incrementing the gantry stepping motor 0.50 millimeter. Thereafter, the Read/Write head is incremented in one millimeter increments to the outer track. This continues in this manner until all necessary data has been accessed. Of course, if the stored data is directed toward an application wherein one would have sequential data stored in adjacent storage regions in a given radial column, an alternate method would be to position the Read/Write head on a given arcuate row along a given arc and then increment the disk stepper motor by a predetermined number of degrees for each storage region in that arcuate row. At each revolution of the disk, the Read/Write head would then be stepped down 0.5 millimeters to the next arcuate row and then an angular change made to compensate for the difference between the first and second rows and then the next arcuate row would be traversed by another revolution of the disk. Therefore, each arcuate row would be accessed merely by positioning the Read/Write head and then incrementing the disk by a predetermined angular step with only a minor adjustment made between adjacent arcuate rows.

Figure 10:
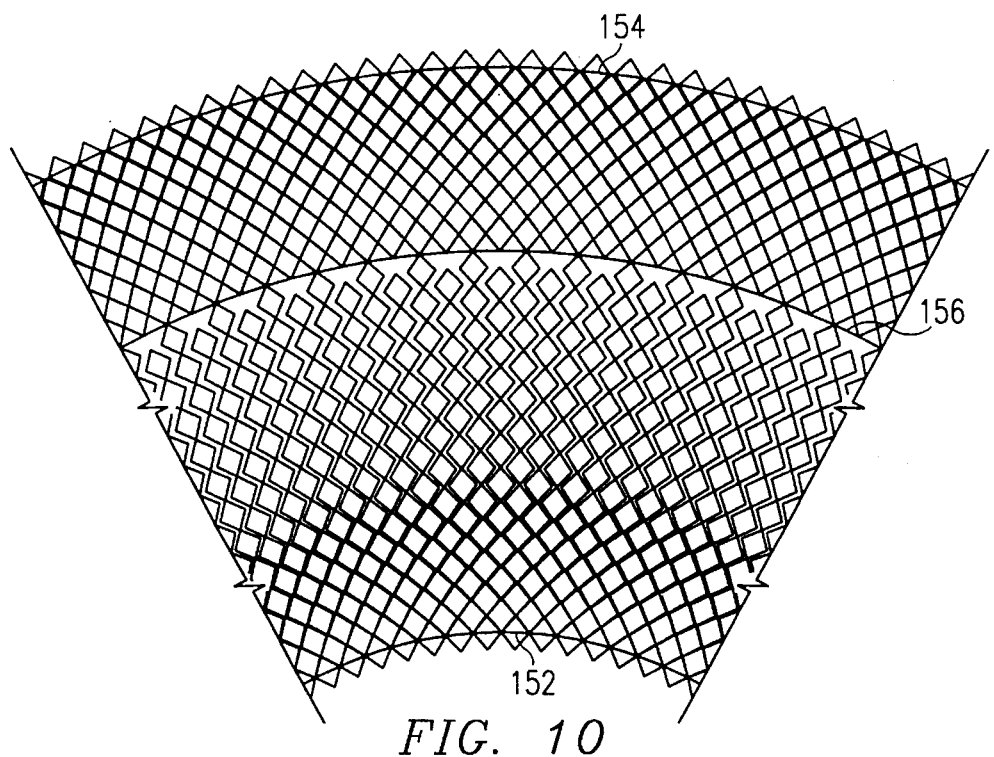
FIG. 10 illustrates an alternate embodiment of the packing configuration of the present invention.

Referring now to FIG. 10, there is illustrated an alternate embodiment of the stacking configuration wherein a larger number of stacks are accommodated. In this configuration, the disk is provided with an inner track 152 and an outer track 154. The diamond-shaped storage regions 142 are configured adjacent the inner track 152 similar to the way they were positioned with respect to the embodiment of FIG. 9. However, a median track 156 is provided along an arc that is between the inner track 152 and the outer track 154. The median track 156 defines a point at which the configuration is again changed to place another radial column of diamond-shaped storage regions 142 between adjacent radial columns that exist between the inner track 152 and the median track 156. This requires that the holographic storage regions in each of the two rows between the inner track 152 and the median track 156 be adjusted outside of the track radius 156 to be in the same row and then the additional radial column of holographic storage regions inserted therebetween in a stacked configuration. This will allow 3,450 stacks to be disposed on the surface of the disk. The reading arrangement is illustrated in FIG. 10a with respect to a sequential reading of radial columns corresponding to the configuration of FIG. 9a.

Figure 11:
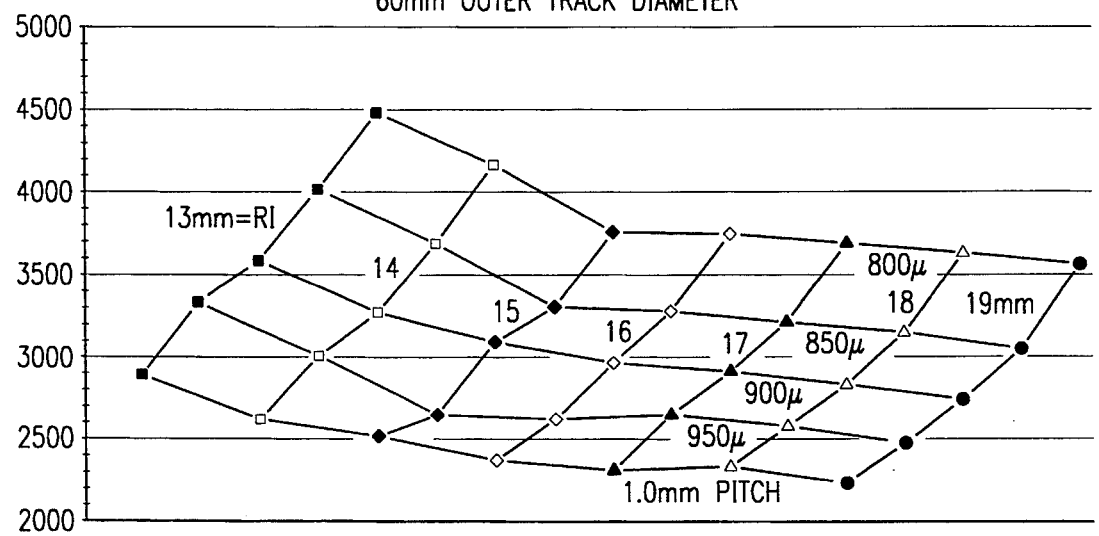
FIG. 11 illustrates a plot of storage locations as a function of the pitch of each of the storage locations and the radius of the inner boundary of the storage locations.

Referring now to FIG. 11, there is illustrated a plot of the number of stack locations that can be fit onto a disk as a function of both the pitch and the inner track radius for an outer track radius of 60 millimeters. It can be seen, for example, that a one millimeter pitch with an inner radius of 13 millimeters results in approximately 2,800 stacks that can be fit onto a disk. If the inner radius were increased to 16 millimeters with a one millimeter pitch, this would result in only 2,400 storage locations on the disk. Similarly, if the pitch for an inner radius of 16 millimeters were increased to 800 microns, this would increase the number of storage locations to 3,400.

Figure 12:
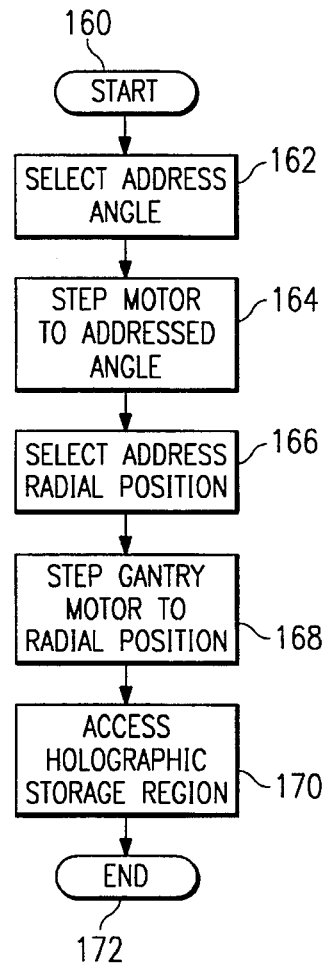
FIG. 12 illustrates a flowchart depicting the positioning technique for positioning the gantry over a storage location.

Referring now to FIG. 12, there is illustrated a flowchart depicting the access operation for any of the storage locations. The program is initiated at a start block 160 and then proceeds to a function block 162 wherein an address angle is selected for the particular storage location. It should be noted that each storage location is addressed by accessing an angular location on the disk and a radial position. After the address angle has been selected, the program flows to a function block 164 in order to step the servo motor to the appropriate addressed angle. The program then flows to a function block 166 to select the addressed radial position. The program then flows to a function block 168 to step the gantry motor to the desired addressed radial position. The program then flows to a function block 170 to access the holographic storage region and then to an end block 172.

Figure 13:
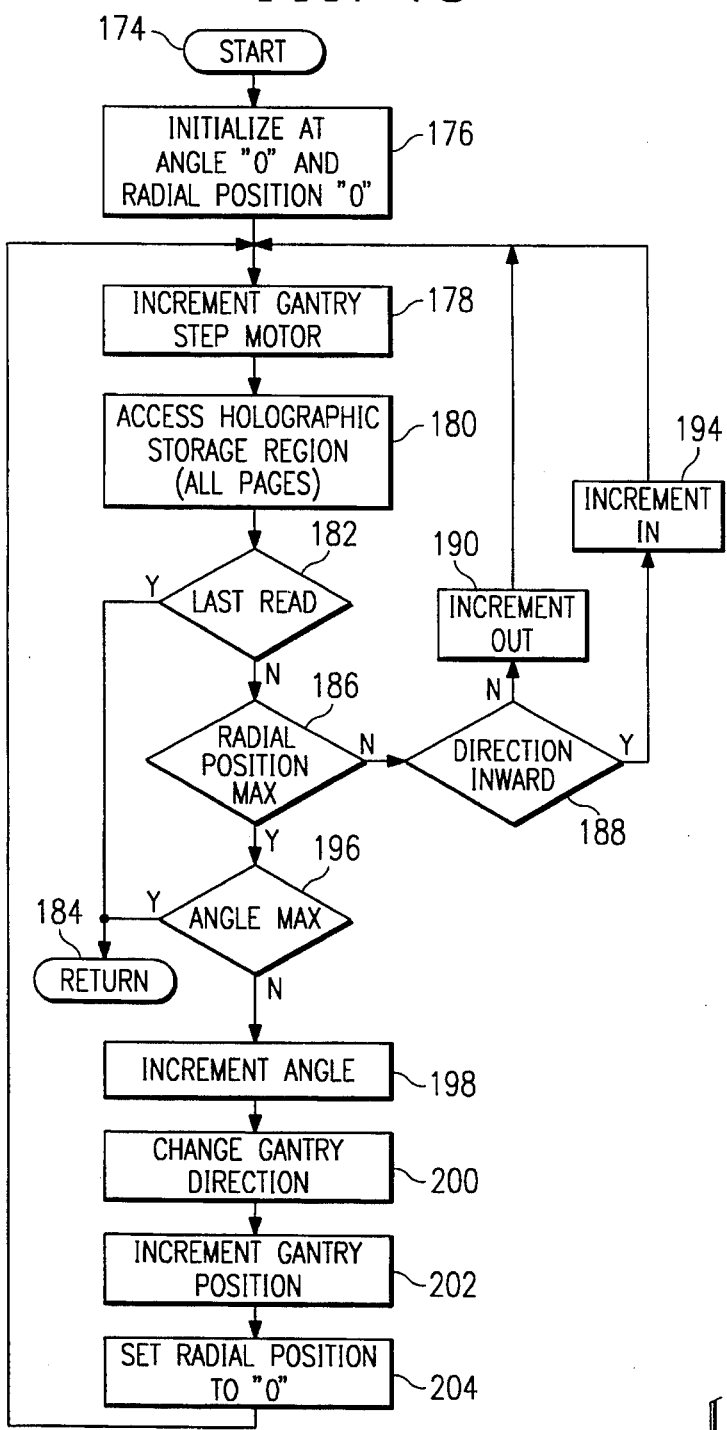
FIG. 13 illustrates a flowchart for sequentially accessing data in the embodiment of FIG. 9.

Referring now to FIG. 13, there is illustrated a flowchart depicting a sequential output operation wherein data is accessed in a serial manner similar to the "page mode" operation in a dynamic random access memory. In this mode, the data is stored such that the output mode requires the data to be sequentially output. For example, this would be utilized in a video environment wherein digitized data was input in a digitized stream and the information would therefore be required to be output in a digitized stream. From an access time standpoint, it is more desirable to move from one storage location to the next adjacent storage location in either an arcuate row or along a radial column in order to minimize the amount of mechanical movement required between accesses.

The program is initiated at a start block 174 and proceeds to a function block 176 to initialize the angular position at "0" and the radial column position at "0". The program then flows to a function block 178 to increment the gantry step motor to the "0" position initially, and then the function block 180 wherein all information holographically stored in the region is accessed. As described above, the information is stored in the form of pages. Therefore, all pages of information are sequentially output by varying the angle of the reference beam at that storage location for an angle multiplexed system and the phase for a phase multiplexed system.

After all pages of information are retrieved from the holographic storage region, the program then flows to a decision block 182 to determine if this was the last Read operation, i.e., the last page of information in the last storage region that was recorded during the initial recording operation for the associated output. If so, the program will flow to a return block 184 along a "Y" path. However, if this is not the last Read operation, the program will flow along an "N" path to decision block 186 to determine if the radial position is maximum, i.e., in the forward direction, this would be the inner radial track, and in the outward direction, this would be the outer radial track. If the position is not maximum, the program will flow along an "N" path to a decision block 188 to determine if the direction is inward. If not, the program flows along an "N" path to a function block 190 to set the direction as outward and then to function block 178 to increment the gantry step motor to the next holographic storage region along the same radial direction. However, if the direction were initially inward, the program would flow along the "Y" path from the decision block 188 to a function block 194 to set the direction of incrementing to an inward direction and then to the input of function block 178.

After the radial position has hit the maximum, i.e., the inner track or the outer track, the program will flow from decision block 186 along the "Y" path to a decision block 196 to determine if the angle has reached a maximum value. This indicates the last radial position for a given output. If so, the program flows along the "Y" path to the return block 184. If not, the program will flow along the "N" path to a function block 198 to increment the angle, i.e., move to the next radial position with the stepper motor for the disk incremented to the next angular position of the next adjacent radial column. The program then flows to a function block 200 to change the overall gantry direction and then to a function block 202 to increment the gantry position, such that the first available row in that radial position is accessed. As described above, adjacent radial columns are offset by fifty percent of the pitch of a given holographic storage region. When moving from one radial column to the next adjacent radial column, an adjustment needs to be made for the initial position on the radial column. Thereafter, it is only necessary to increment the radial column by the pitch of the holographic storage regions. The program then flows to a function block 204 to set the radial position to "0" and then returns to the input of the function block 178 to access the next radial column and the data stored in the associated holographic storage regions.

Figure 14:
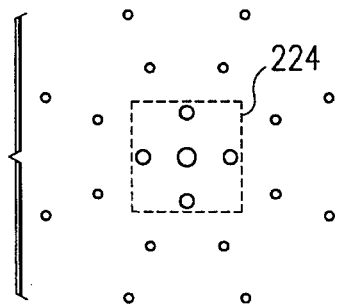
FIG. 14 illustrates a topological view of an alternate embodiment for forming the storage region and the portion of the Fourier transform contained therein.

Referring now to FIG. 14, there is illustrated a diagrammatic view of the Fourier transform of random data stored in a holographic storage location and the portion thereof that comprises the storage location. As described above with respect to FIG. 6, a diamond-shaped or four-sided storage location was defined wherein the first order components of the Fourier transform comprised the four corners of the storage location. In the embodiment illustrated in FIG. 14, a boundary 224 for the storage location is defined wherein the Fourier transform is rotated 45° with respect to that illustrated in FIG. 6, i.e., the first order components are disposed adjacent each side and essentially at the bisection of each side. This, of course, results in a slightly larger storage region than that for the embodiment of FIG. 6. However, it has been noticed that this is beneficial, in that a higher degree of data recovery associated with the information at the corners of the storage region 224 is achieved, which corners were outside of the "diamond-shaped" storage region of FIG. 6. The storage region 224 can be oriented such that the apexes thereof are disposed along a radial axis or they can be organized such that one side thereof is parallel to the tangential line for the associated arcuate row. The storage region 224 has a width of 870 microns and a length of 1.0 mm.

Figure 15:
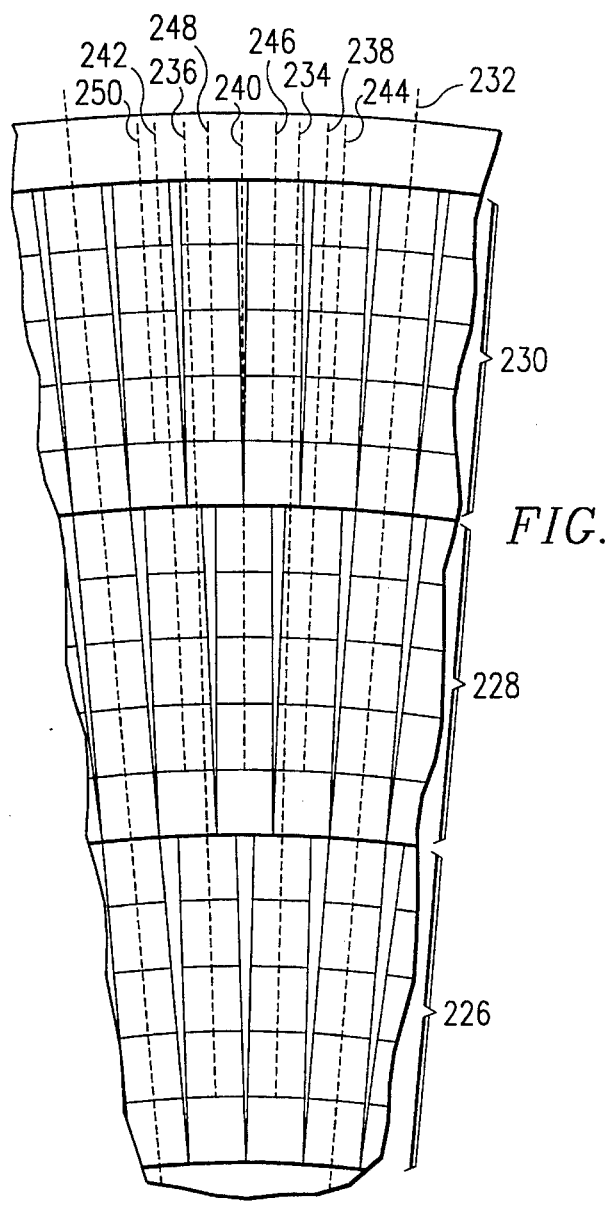
FIG. 15 illustrates an embodiment wherein the storage regions are aligned side by side.

Referring now to FIG. 15, there is illustrated an alternate embodiment of the present invention for the stacking configuration wherein each of the storage locations 224 of FIG. 14 are aligned such that one side thereof is disposed parallel to the tangential line of each arcuate row. It should be understood that the storage region of FIG. 6 could also be stacked in this manner. In the packing configuration of FIG. 15, the storage locations 224 are organized into three stacking sectors, a sector 226 closest to the rotational center, a sector 228 disposed adjacent to the sector 226 and disposed farther away from the rotational center and a sector 230 disposed adjacent to the sector 228 and disposed farther from the rotational center of the disk. Each of the sectors 226, 228 and 230 are organized such that the storage locations therein are aligned along a given common radial column at predetermined and repetitive radial positions about the disk, the portion of the sectors 224, 226, and 228 between the periodic common radial column comprises a segment. All of the storage locations associated with the common radial column for each sector have the same angular position, this common radial column being the first radial column in the segment and also in each of the sectors 224, 226, and 228. This common radial column for the segment illustrated in FIG. 15 is defined along a first radial column 232.

In the first arcuate row in segment 226 in the segment illustrated in FIG. 15 will be comprised of three storage locations along the radial column 232, a radial column 234 and a radial column 236. In the first arcuate row, each of the storage locations are disposed adjacent each other at the sides most proximate to the rotational center of the disk. As the arcuate row value increases outward from the rotational center of the disk, the storage locations move away from each other in the associated radial columns 232, 234 and 236. In the fifth arcuate row, the spacing between storage locations is approximately equal at the outermost edge thereof to the width of one of the storage locations. This marks the boundary between the sectors 226 and 228 for the illustrated segment. In the sector 228, in the first arcuate row thereof, there are four storage locations in a given sector with the first one thereof aligned along the radial column 232. The remaining ones are aligned along a radial column 238, a radial column 240 and a radial column 242, respectively. Along the first arcuate row in the segment 228, the edges of the storage locations most close to the rotational center are disposed adjacent each other and then separated as the number of the arcuate row increases. In the fifth arcuate row in the segment 228, the accrued distance between storage locations is substantially equal the width of one storage location. This marks a boundary between the segment 228 and the segment 230. In the next arcuate row, the first row of segment 230, an additional storage location is added such that five storage locations are disposed in each arcuate row and disposed adjacent each other. They are disposed such that the first storage location is along the radial column line 238 and the remaining four storage locations in segment 230 are along radial columns 244, 246, 248 and 250, respectively.

With the configuration illustrated in FIG. 15, it can be seen that the disk is divided up into a plurality of radial segments, each initiated at one of the column lines 232. Therefore, at each radial column 232, the relative position in radians of each of the other arcuate columns for all the storage locations associated with that radial segment are known relative to that radial segment. For example, if the storage location in the second arcuate row in the third radial column of sector 228 for a given radial segment were addressed, it would only be necessary to look up the radial position of the associated radial column 232 and the relative radial position of the column 240 relative to the radial column 232. Therefore, for each radial segment, it is only necessary to store information regarding the relative radial positions of nine radial columns relative to the common radial column 238. This significantly reduces the size of the lookup table for the addressing function.

Figure 16:
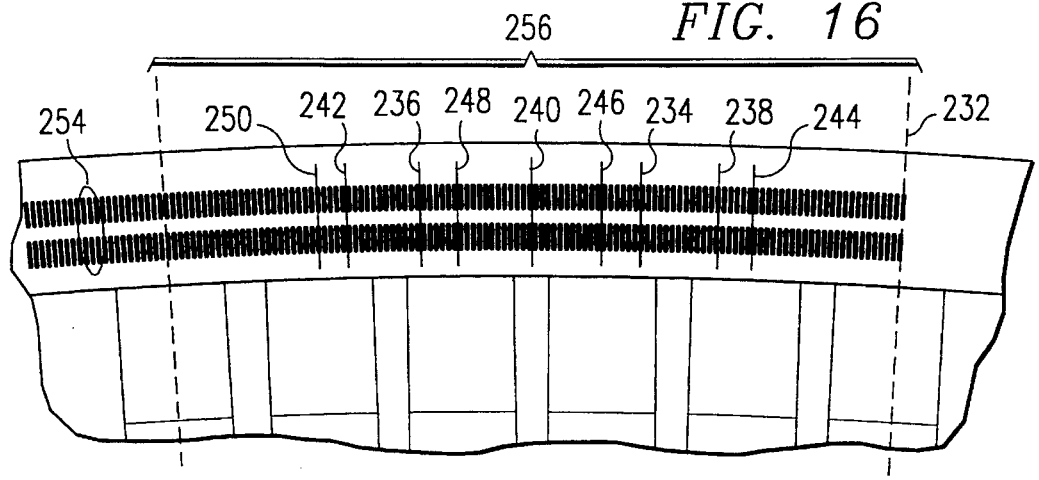
FIG. 16 illustrates a detail of the fiducial marks along the edge of the disk.

Referring now to FIG. 16, there is illustrated a detail of a fiducial marking system disposed around the edge of the disk. This fiducial marking system is operable to allow for accurate radial positioning of the disk relative to the zero value index mark. As such, the disk can then be disposed on the spindle of the servo motor and then the "0" radial position determined. The illustration of FIG. 16 illustrates only a single radial segment 256.

Figure 17:
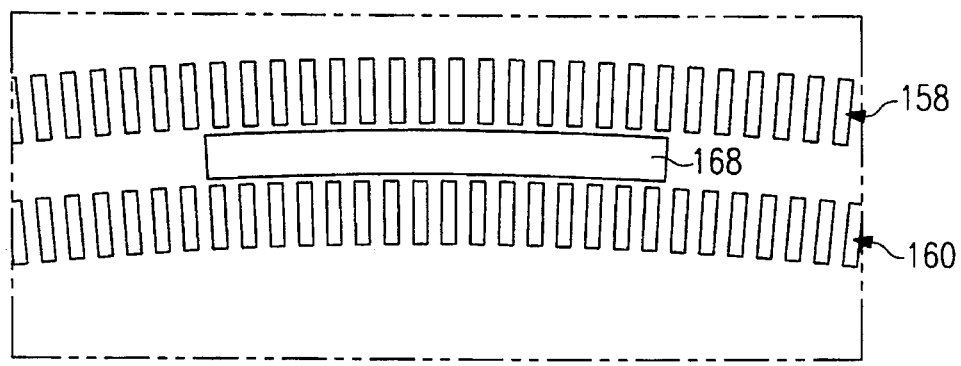
FIG. 17 illustrates a detail of the fiducial marks.
Figure 17A:
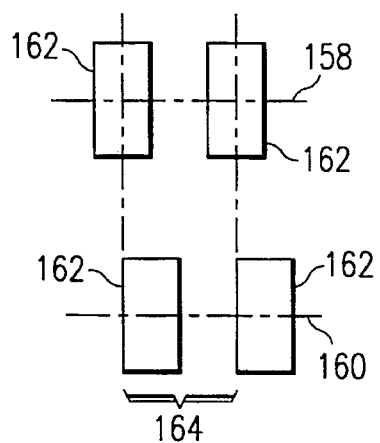
FIG. 17a illustrates a more detailed view of the detail of FIG. 17.
Figure 17B:
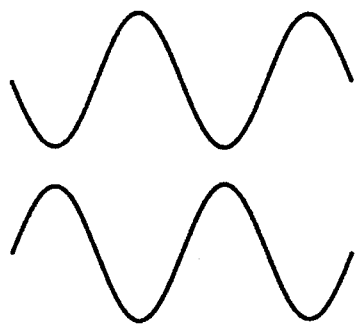
FIG. 17b illustrates the waveform for the detection operation of the fiducial marks.

Referring now to FIG. 17, there is illustrated a detail of the fiducial markings illustrating the index mark. The fiducial marks are comprised of two arcuate rows 158 and 160 of small reflective boxes 162, with spaces disposed therebetween, a detail of which is illustrated in FIG. 17a. The reflective boxes 162 are organized as a quadrature pair 164, which quadrature pair 164 is comprised of one of the reflective boxes 162 and the adjacent space. Each of the reflective boxes 162 in the arcuate row 160 is offset by 90° from the corresponding reflective box 162 in the arcuate row 158. As such, the edge of the reflective box in arcuate row 158 will be aligned with the center of the reflective box 162 in the arcuate row 160. This will result in the waveform of FIG. 17b in the detector circuit, which is utilized for the synchronization procedure as the disk is rotated.

For the purpose of providing an initial index reading, an index box 168 is provided and disposed between the arcuate rows 158 and 160. The reflective box 168 has a width that is equal to the sum of the widths of approximately forty of the reflective boxes 162. There are approximately 3,600 quadrature pairs 164 of each of the reflective boxes 162, each box 162 having a width of approximately 26.5 microns.

Figure 18:
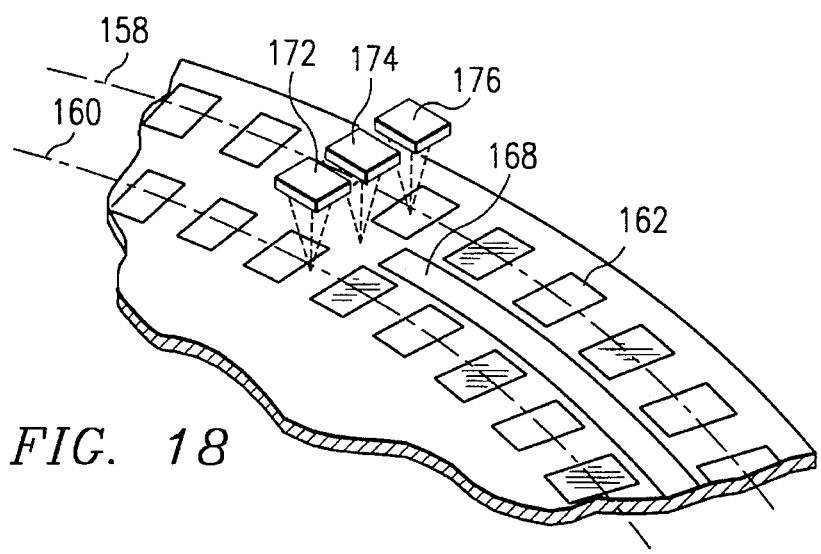
FIG. 18 illustrates a perspective view of the detector system.

Referring now to FIG. 18, there is illustrated a perspective view of the detector system. The detector system is comprised of three transmit/receive systems 172, 174 and 176, each operable to transmit an optical beam and then receive and detect the reflection thereof from one of the boxes 162 or the box 170. The transmit/receive system 172 is associated with the arcuate row 160, the transmit/receive system 174 is associated with the index box 168 and the transmit/receive system 176 is associated with the arcuate row 158.

In summary, there has been provided a disk-based holographic storage system. The disk is mounted onto a stepper motor, which stepper motor is operable to increment the disk in predetermined degree increments. A holographic Read/Write mechanism is then positioned over a given holographic storage region on the disk and information written thereto or read therefrom. The storage regions are organized on the holographic storage disk such that holographic storage regions are disposed along common radial lines or "radial columns". At the inner radius of the holographic storage regions, the holographic storage regions are packed tightly. As the holographic storage regions progress outward along a given radial column, they are separated from the adjacent radial column in the same track. Further, each of the holographic storage regions is diamond-shaped with two of the apexes of the diamond-shaped holographic storage regions disposed along the same radial column. Adjacent columns are organized such that the holographic storage regions are offset relative to each other by one half of the pitch of the holographic storage region. This allows for maximum packing capacity.

Although the preferred embodiment has been described in detail, it should be understood that various changes, substitutions and alterations can be made therein without departing from the spirit and scope of the invention as defined by the appended claims.

What is claimed is:

1. A holographic data storage system, comprising:

a holographic media for storing data images, said holographic media having:

a storage layer of holographic storage media having a predetermined thickness and a disk shape with a rotational center, said storage layer operable to store holographic representations of a plurality of pages of data images, and a plurality of storage regions defined within said storage layer and arranged in addressable arcuate rows and radial columns, such that each of said arcuate rows is disposed about a concentric arc a finite distance from said rotational center and each of said radial columns extends along a line oriented radially outward from said rotational center;

a media drive for rotating said holographic media to an addressed one of said radial columns;

a Read/Write head for being positioned along a radial path to a position proximate to the addressed one of said storage locations to optically read information from said storage location or optically store information therein; and a head positioning device for radially positioning said Read/Write head proximate to said addressed storage location which, in combination with said media drive, allows said Read/Write head to be positioned in a fixed position proximate to the addressed one of said storage locations in the addressed one of said radial columns and arcuate rows.

2. The data storage system of claim 1, wherein said layer of holographic storage media comprises a Write Once Read Many media.

3. The data storage system of claim 1, wherein said storage layer is comprised of:

a substrate having a disk shape with a rotational center; and a layer of photopolymer disposed on the surface of said substrate, said photopolymer layer operable to store interference gratings representing said data image.

4. The data storage system of claim 1, wherein said head positioning device is operable to control said Read/Write head such that it moves only in a radial direction from a position proximate to the innermost of said arcuate rows to the outermost of said arcuate rows in a reciprocal motion, said head positioning device moving in discrete steps along a single radial column.

5. The data storage system of claim 1, wherein each of said storage locations is diamond-shaped with two of the opposing apexes thereof substantially aligned along the associated one of said radial columns.

6. The data storage system of claim 5, wherein the ones of said storage locations in said arcuate row disposed closest to said rotational center are in close proximity to each other, and which row comprises a first arcuate row.

7. The data storage system of claim 5, wherein said storage regions in said first arcuate row are disposed in alternating ones of said radial columns such that all of said storage regions associated with the ones of said radial columns associated with said first arcuate row are associated with odd numbered ones of said arcuate rows.

8. The data storage system of claim 7, wherein the ones of said storage regions disposed in a second arcuate row adjacent said first arcuate row are disposed adjacent said storage regions in said first arcuate row.

9. The data storage system of claim 8, wherein adjacent ones of said arcuate rows are separated by one-half the pitch of said storage regions.

10. The data storage system of claim 5, wherein said data image is stored in said storage region as a Fourier transform of said data image, said Fourier transform having a central zero order component and four first order components which are disposed equi-distant about said central zero order component and wherein said Fourier transform is oriented such that said first order components are disposed proximate to the apexes of said diamond-shaped storage regions.

11. The storage system of claim 1, wherein each of said storage locations is rectangular-shaped with one side thereof substantially parallel to the tangent of said associated arcuate row.

12. The data storage system of claim 11, wherein the ones of said storage locations in said arcuate row disposed closest to said rotational center are in close proximity to each other, and which row comprises a first arcuate row.

13. The data storage system of claim 11, wherein said data image is stored in said storage region as a Fourier transform of said data image, said Fourier transform having a zero order component and four first order components which are disposed equi-distant about said center zero order component and wherein said Fourier transform is oriented such that said first order components are disposed proximate to the bisection of the sides of said storage region.

14. A holographic data storage disk, comprising a plurality of storage locations arranged in arcuate rows and radial columns, each of said storage locations for holographically storing a plurality of pages of data images; each of said storage locations stored along said arcuate rows and said radial columns within said disk such that each of said storage locations has addressable locations defined along one of said radial columns and within one of said arcuate rows, and wherein each of said storage locations is diamond-shaped with two of the opposing apexes thereof substantially aligned along the associated one of said radial columns.

15. A holographic data storage disk, comprising a plurality of storage locations arranged in arcuate rows and radial columns, each of said storage locations for holographically storing a plurality of pages of data images; each of said storage locations stored along said arcuate rows and said radial columns within said disk such that each of said storage locations has addressable locations defined along one of said radial columns and within one of said arcuate rows, and wherein each of said storage locations is rectangular-shaped with one of the sides thereof substantially parallel to the tangent of the associated arcuate row.

16. The holographic data storage disk of claim 15, wherein said data image is stored in said storage region as a Fourier transform of said data image, said Fourier transform having a central zero order component and four first order components which are disposed equi-distant about said zero order component and wherein said Fourier transform is oriented such that the first order components are disposed proximate to the bisection of each of the sides of said storage region.

17. A holographic data storage disk, comprising:

a plurality of storage locations disposed on the surface of said disk and arranged in arcuate rows and radial columns, each of said storage locations for holographically storing a plurality of pages of data images;

each of said storage locations stored along said arcuate rows and said radial columns in said disk such that each of said storage locations has addressable locations defined along one of said radial columns and within one of said arcuate rows; and a fiducial marking pattern that constitutes a unique, known pattern and spatially unchanging from disk to disk and disposed on said disk at select radial locations relative to said radial columns, such that said fiducial marking pattern can interface with an external device to allow said external device to synchronize with the angular position of said radial columns.

18. The holographic storage disk of claim 17, wherein said fiducial marking pattern is comprised of a plurality of reflective areas disposed about the peripheral edge of the holographic data storage disk and in even increments.

19. The holographic data storage disk of claim 17, wherein said fiducial marking pattern is disposed on the peripheral edge of the holographic data storage disk.

* * * * *

UNITED STATES PATENT AND TRADEMARK OFFICE
CERTIFICATE OF CORRECTION

PATENT NO. : 5,566,387
DATED : October 15, 1996
INVENTOR(S) : Dewald

It is certified that error appears in the above-indentified patent and that said Letters Patent is hereby corrected as shown below:

Column 4, line 25, delete "convened", and insert therefor --converted--.

Signed and Sealed this

Eighth Day of July, 1997

Attest:

BRUCE LEHMAN

Attesting Officer

Commissioner of Patents and Trademarks